United States Patent
Debrus et al.

(10) Patent No.: US 10,906,627 B2
(45) Date of Patent: Feb. 2, 2021

(54) ELECTROSTATIC DISCHARGE NOISE SUPPRESSION BY CONDUCTION BETWEEN A STEPPED METAL ELEMENT AND THE PANE RETAINER

(71) Applicants: SAINT-GOBAIN GLASS FRANCE, Courbevoie (FR); AIRBUS OPERATIONS SAS, Toulouse (FR)

(72) Inventors: Marie-Hélène Debrus, Dampierre en Burly (FR); Thomas Tondu, Sully (FR); Hugo Canales, Toulouse (FR); Franck Flourens, Toulouse (FR); Catherine Unfer, Toulouse (FR); Osmin Delverdier, Toulouse (FR)

(73) Assignees: SAINT-GOBAIN GLASS FRANCE, Courbevoie (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/628,857
(22) PCT Filed: Jul. 6, 2018
(86) PCT No.: PCT/FR2018/051697
§ 371 (c)(1),
(2) Date: Jan. 6, 2020
(87) PCT Pub. No.: WO2019/008290
PCT Pub. Date: Jan. 10, 2019

(65) Prior Publication Data
US 2020/0223528 A1 Jul. 16, 2020

(30) Foreign Application Priority Data
Jul. 6, 2017 (FR) .................................... 17 00720

(51) Int. Cl.
*B64C 1/14* (2006.01)
*B32B 17/10* (2006.01)
(52) U.S. Cl.
CPC ...... *B64C 1/1492* (2013.01); *B32B 17/10045* (2013.01); *B32B 17/1077* (2013.01);
(Continued)

(58) Field of Classification Search
CPC . B64C 1/1492; B64D 45/02; B32B 17/10045; B32B 17/10293
See application file for complete search history.

(56) References Cited

U.S. PATENT DOCUMENTS 3,414,445 A * 12/1968 Orcutt ............... B32B 17/10366
156/106
3,919,022 A * 11/1975 Stefanik ............ B32B 17/10293
156/104

(Continued)

FOREIGN PATENT DOCUMENTS

EP 0 376 190 A2 7/1990
FR 2 888 082 A1 1/2007

(Continued)

OTHER PUBLICATIONS

International Preliminary Report on Patentability and the Written Opinion of the International Searching Authority as issued in International Patent Application No. PCT/FR2018/051697, dated Jan. 7, 2020.

(Continued)

*Primary Examiner* — Babajide A Demuren
(74) *Attorney, Agent, or Firm* — Pillsbury Winthrop Shaw Pittman LLP

(57) ABSTRACT

A laminated glazing includes a first and a second glass sheet that are bonded by a first interlayer adhesive layer, a peripheral zone of the laminated glazing being covered by a stepped metal element, a window press that is rigidly connected to the structure for mounting the laminated glazing making contact with the laminated glazing, so as to hold the laminated glazing secure to its mounting structure, an electrical conductor linking the stepped metal element and the structure for mounting the laminated glazing by way of the window press.

22 Claims, 1 Drawing Sheet

(52) U.S. Cl.
CPC .. *B32B 17/10293* (2013.01); *B32B 17/10761* (2013.01); *B32B 17/10788* (2013.01)

(56) References Cited

U.S. PATENT DOCUMENTS

| | | | |
|---|---|---|---|
| 3,953,630 A | | 4/1976 | Roberts et al. |
| 4,960,631 A | * | 10/1990 | Walters ............. B32B 17/10302 |
| | | | 296/84.1 |
| 9,598,166 B2 | * | 3/2017 | Yokoi ................... B64C 1/1492 |
| 2004/0021334 A1 | * | 2/2004 | Blevins ............ B32B 17/10036 |
| | | | 296/84.1 |
| 2010/0020381 A1 | * | 1/2010 | Legois ................ B32B 17/1077 |
| | | | 359/275 |
| 2013/0026296 A1 | | 1/2013 | Yokoi et al. |

FOREIGN PATENT DOCUMENTS

| | | | | |
|---|---|---|---|---|
| FR | 2909921 A1 | * | 6/2008 | ....... B32B 17/10495 |
| JP | 2000-286591 A1 | | 10/2000 | |
| WO | WO-2014183611 A1 | * | 11/2014 | |

OTHER PUBLICATIONS

International Search Report as issued in International Patent Application No. PCT/FR2018/051697, dated Nov. 30, 2018.

\* cited by examiner

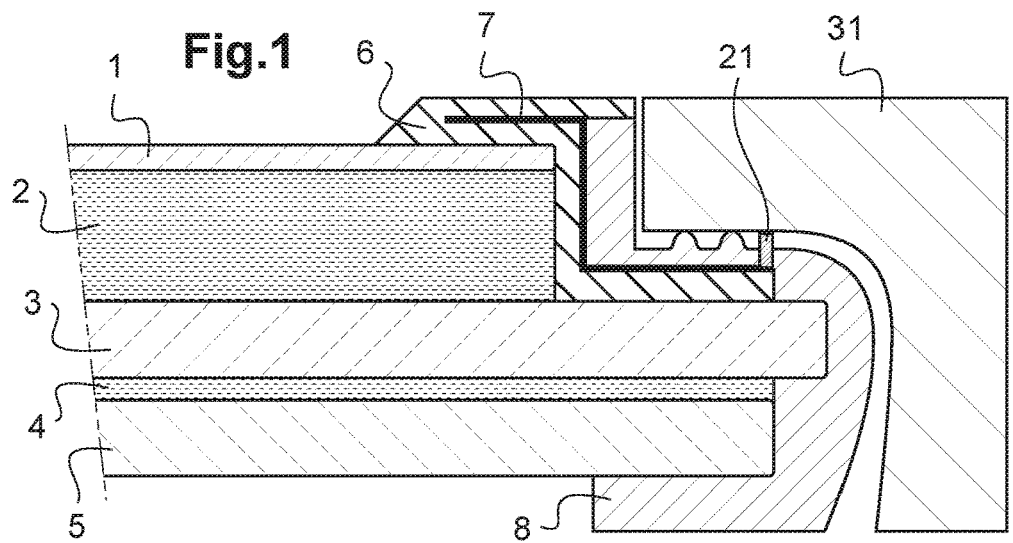
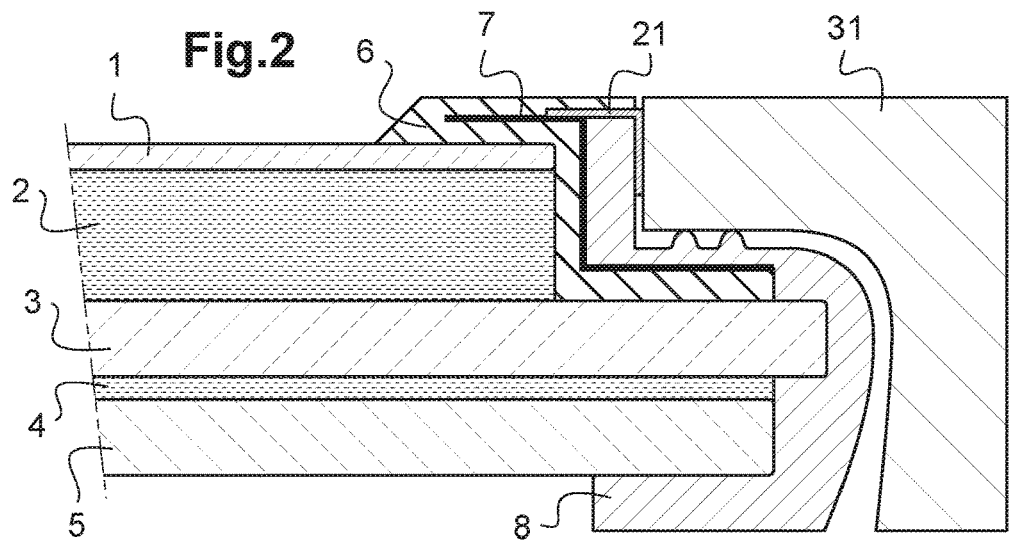
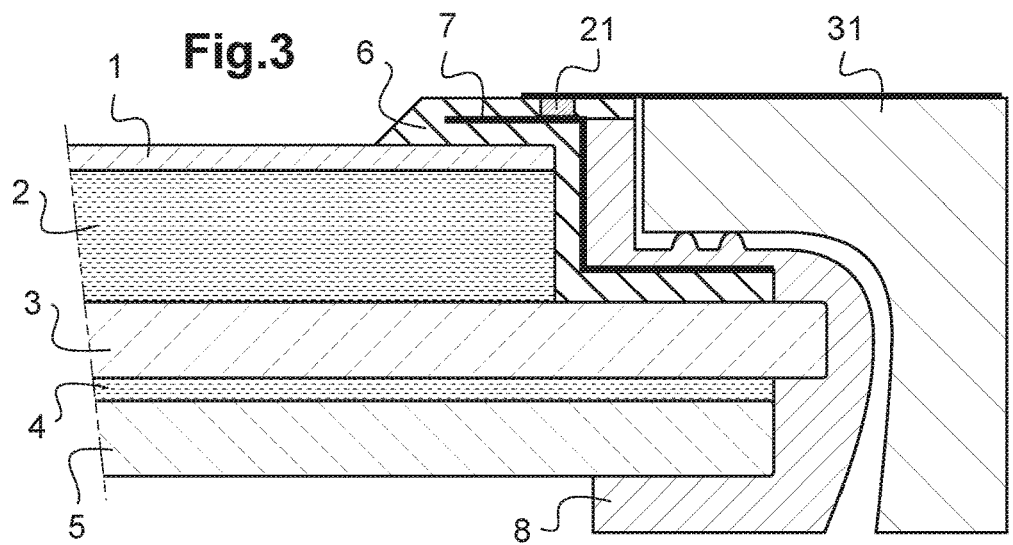

ELECTROSTATIC DISCHARGE NOISE SUPPRESSION BY CONDUCTION BETWEEN A STEPPED METAL ELEMENT AND THE PANE RETAINER

CROSS-REFERENCE TO RELATED APPLICATIONS

This application is the U.S. National Stage of PCT/FR2018/051697, filed Jul. 6, 2018, which in turn claims priority to French patent application number 1700720 filed Jul. 6, 2017. The content of these applications are incorporated herein by reference in their entireties.

Aircraft cockpit glazings are assemblies of mineral and/or organic glasses assembled together by lamination with interlayer adhesive layers. The penetration of water by diffusion through the interlayer adhesive layers may lead to faults in the laminated glazing, for example by promoting delamination or by damaging the electrical systems that are incorporated within the glazing.

A common counter to the penetration of moisture into the lamination interlayer adhesive layers consists in peripherally applying a conformal metal element to a peripheral zone of the laminated glazing, in particular a stepped metal element as will be seen hereinafter, which metal element is commonly referred to as a "zed" due to the shape of this strip.

This zed is bonded to the glass sheets of the laminated glazing and may be covered by an air- and watertight seal, for example made of silicone or equivalent, as well as by a "bead" (external seal) affording good durability and aerodynamic properties. This external seal is made of polysulfide or equivalent.

The metal zed is therefore located within silicone and polysulfide, and is electrically isolated from the internal electrical elements of the laminated glazing and from its mounting structure. It is electrically floating, and liable to carry electrostatic charge. It may be charged under certain flight conditions at potentials that differ substantially from those of the aircraft structure. The zed typically becomes charged due to flights through a charging environment: triboelectric charging through impacts with particles in the environment such as snow, ice, dust or pollution. Although the aircraft structure is fitted with discharging systems, elements such as the glazings, which are electrically isolated, accumulate charge.

In particular, the charge gathered by the glazing may be partly drained into the zed. Potentials allowing electrostatic discharges between the zed and the aircraft structure (or electrical systems incorporated within the glazing) may be reached.

This may result in
a sound signature startling the pilot;
a light signature (flash, sparks) startling the pilot;
an electromagnetic signature interfering with aircraft equipment.

The object of the invention is to prevent the occurrence of discharge potentials by managing the flow of electricity toward the window press that is electrically interdependent with the structure for mounting the laminated glazing, in particular the aircraft structure.

This object is achieved by the invention, which consequently has as subject matter a laminated glazing comprising at least a first glass sheet forming an exterior face of the glazing, which first sheet is linked to a second glass sheet by a first interlayer adhesive layer, wherein the edge of the first glass sheet is set back with respect to that of the second, a peripheral portion of the free surface of the first glass sheet, the edge of this glass sheet, the edge of the first interlayer adhesive layer and a portion of the surface of the second glass sheet extending beyond the first glass sheet describing a continuous stepped contour which is covered by a stepped metal element, a window press that is rigidly connected to the structure for mounting the laminated glazing and the shape of which is substantially complementary to that of the continuous stepped contour making contact with the laminated glazing in the volume described by the continuous stepped contour, so as to hold the laminated glazing secure to its mounting structure, characterized in that an electrical conductor links the stepped metal element and the structure for mounting the laminated glazing by way of the window press.

As mentioned above, the stepped metal element prevents moisture from penetrating into the lamination interlayer adhesive layers. It may be made of aluminium, stainless steel or other metal, and may interchangeably be referred to as the "zed" hereinafter.

Preferably, the electrical resistance between the stepped metal element and the structure for mounting the laminated glazing is at most equal to 30 MΩ.

According to other preferred features of the laminated glazing of the invention:
it comprises at least a third glass sheet that is linked to the second glass sheet by a second interlayer adhesive layer;
the window press is bolted/screwed to the structure for mounting the laminated glazing; this arrangement is suitable for mounting the laminated glazing from the outside of its mounting structure;
according to one alternative, the window press is formed integrally with the structure for mounting the laminated glazing (it forms an integral part thereof); the laminated glazing is then mounted from the inside of its mounting structure, to which structure it is rigidly connected by attaching an interior trim to said structure, which trim is referred to as an interior window press;
said continuous stepped contour is covered by the stepped metal element (or zed) with the interposition of an external seal, a portion of which is folded over the stepped metal element so as to afford the laminated glazing good durability and aerodynamic properties; the external seal is made of polysulfide or equivalent;
the stepped metal element is covered by an air- and watertight seal made of silicone or equivalent;
the electrical conductor is compressible and passes locally through the leak-tight seal; it is possible to locally remove the material of the leak-tight seal, or else this material may be absent by virtue of the process for forming the leak-tight seal (injection moulding, etc.); the compressible electrical conductor may be a foam filled with electrically conductive elements, a spring, etc.;
the electrical conductor is positioned partly at the interface between the external seal and the leak-tight seal;
the electrical conductor passes locally through the folded-over portion of the external seal and extends while maintaining contact up to an exterior surface of the window press, including a screw or a bolt for attaching said window press to the structure for mounting the laminated glazing; as above, it is possible to locally remove material from this folded-over portion, or else this material may be locally absent by virtue of the process for forming the external seal (injection moulding, etc.);

the first glass sheet is made of a mineral glass with a thickness of between 0.5 and 5 mm, preferably between 2 and 4 mm, or made of a polymer material such as poly(methyl methacrylate) (PMMA) with a thickness of between 0.5 and 5 mm;

the second glass sheet and, if applicable, the third glass sheet and so on are made of a mineral glass with a thickness of between 5 and 10 mm, or made of a polymer material such as poly(methyl methacrylate) (PMMA) with a thickness of between 5 and 30 mm, preferably at most 20 mm; these glass sheets are referred to as "structural folds";

the interlayer adhesive layers are made of polyurethane (PU), polyvinyl butyral (PVB), ethylene/vinyl acetate (EVA) or equivalent, the thickness of the first interlayer adhesive layer is between 3 and 10 mm, preferably 4 and 8 mm, and the thickness of the second interlayer adhesive layer and, if applicable, of the following layers is between 0.5 and 4 mm, preferably at most equal to 2 mm.

Another subject matter of the invention consists in the use of a laminated glazing described above as building, ground, air or water vehicle glazing, or glazing for street furniture, in particular as aircraft cockpit glazing. Aircraft cockpits may include two front glazings and two to four side glazings.

The invention will be better understood in light of the following description of the appended drawings, in which:

FIG. 1 is a schematic representation of a laminated glazing according to the invention in which the electrical conductor is compressible and passes locally through the leak-tight seal;

FIG. 2 is a schematic representation of a laminated glazing according to the invention in which the electrical conductor is positioned partly at the interface between the external seal and the leak-tight seal FIG. 3 is a schematic representation of a laminated glazing according to the invention in which the electrical conductor passes locally through the folded-over portion of the external seal and extends while maintaining contact up to an exterior surface of the window press, including a screw or a bolt for attaching said window press to the structure for mounting the laminated glazing.

In these examples, a glass sheet refers to a chemically tempered aluminosilicate glass sheet, marketed by Saint-Gobain Sully under the Solidion® registered trademark.

With reference to FIGS. 1, 2 and 3, a laminated glazing comprises a first glass sheet 1 forming an exterior face of the glazing, having a thickness of 3 mm, which is bonded to a second glass sheet 3 having a thickness of 8 mm by a first polyvinyl butyral (PVB) interlayer adhesive layer 2 having a thickness of 5.3 mm.

A third glass sheet 5 having a thickness of 8 mm is bonded to the second 3 by a second polyvinyl butyral (PVB) interlayer adhesive layer 4 having a thickness of 2 mm.

The edge of the first glass sheet 1 is set back with respect to that of the second 3, a peripheral portion of the free surface of the first glass sheet 1, the edge of this glass sheet 1, the edge of the first interlayer adhesive layer 2 and a portion of the surface of the second glass sheet 3 extending beyond the first glass sheet 1 describing a continuous stepped contour which is covered by a stepped metal element 7 made of aluminum.

Said continuous stepped contour is covered by the stepped metal element 7 with the interposition of an external seal 6 made of polysulfide, a portion of which is folded over the stepped metal element 7 so as to afford the laminated glazing good durability and aerodynamic properties.

The stepped metal element 7 is covered by an air- and watertight seal 8 made of silicone.

The laminated glazing shown in FIGS. 1, 2 and 3 may be installed from the outside via a structure for mounting the laminated glazing, by bolting to the mounting structure a window press 31 covering the laminated glazing; this bolting may or may not result in the laminated glazing being pinched, the laminated glazing may also be bonded to the window press 31, and in any case held durably secure to the mounting structure. The window press 31 is a trim added from the outside.

Mounting from the inside is also possible. In this case, the shape of the window press mentioned above is present but forms an integral part of the mounting structure, and a trim (window press) is added from the inside. Bolting the inside window press and bonding the laminated glazing may be combined, with or without the laminated glazing being pinched.

With reference to FIG. 1, a compressible electrical conductor 21 electrically links the zed 7 and an interior surface of the window press 31 through a reserve produced in the leak-tight seal 8. The electrical conductor 21 is made of foam filled with conductive elements.

In FIG. 2, an electrical conductor 21 consisting of an aluminium or stainless steel profile electrically links the zed 7 and a frontal surface of the window press 31, passing in particular through the interface between the external seal 6 and the leak-tight seal 8.

In FIG. 3, the electrical conductor 21 passes locally through the folded-over portion of the external seal 6 and extends while maintaining contact up to an exterior surface of the window press 31.

For each of the laminated glazings represented schematically in FIGS. 1 to 3, the electrical conductor 21 may, at each of its two ends, be brazed, screwed, crimped, glued or pinched according to the configuration of the electrical link.

No unwanted discharging of the zed, nor any disruptive noise signaling this discharge, are observed in the glazings according to the invention.

The invention claimed is:

1. A laminated glazing comprising at least a first glass sheet forming an exterior face of the glazing, which first glass sheet is linked to a second glass sheet by a first interlayer adhesive layer, wherein an edge of the first glass sheet is set back with respect to an edge of the second glass sheet, a peripheral portion of a free surface of the first glass sheet, the edge of the first glass sheet, an edge of the first interlayer adhesive layer and a portion of a surface of the second glass sheet extending beyond the first glass sheet describing a continuous stepped contour which is covered by a stepped metal element, a window press that is rigidly connected to a mounting structure for mounting the laminated glazing and a shape of which is substantially complementary to that of the continuous stepped contour making contact with the laminated glazing in a volume described by the continuous stepped contour, so as to hold the laminated glazing secure to the mounting structure, wherein said continuous stepped contour is covered by the stepped metal element with the interposition of an external seal, wherein the stepped metal element is covered by an air- and watertight seal, and wherein an electrical conductor links the stepped metal element and the structure for mounting the laminated glazing by way of the window press.

2. The laminated glazing as claimed in claim 1, wherein an electrical resistance between the stepped metal element and the structure for mounting the laminated glazing is at most equal to 30 MΩ.

3. The laminated glazing as claimed in claim 1, further comprising at least a third glass sheet that is linked to the second glass sheet by a second interlayer adhesive layer.

4. The laminated glazing as claimed in claim 1, wherein the window press is bolted or screwed to the structure for mounting the laminated glazing.

5. The laminated glazing as claimed in claim 4, wherein the window press is formed integrally with the structure for mounting the laminated glazing.

6. The laminated glazing as claimed in claim 1, wherein a portion of the external seal is folded over the stepped metal element so as to afford the laminated glazing good durability and aerodynamic properties.

7. The laminated glazing as claimed in claim 1, wherein the electrical conductor is compressible and passes locally through the leak-tight seal.

8. The laminated glazing as claimed in claim 1, wherein the electrical conductor is positioned partly at the interface between the external seal and the leak-tight seal.

9. The laminated glazing as claimed in claim 6, wherein the electrical conductor passes locally through the folded-over portion of the external seal and extends while maintaining contact up to an exterior surface of the window press, including a screw or a bolt for attaching said window press to the structure for mounting the laminated glazing.

10. The laminated glazing as claimed in claim 1, wherein the first glass sheet is made of a mineral glass with a thickness of between 0.5 and 5 mm.

11. The laminated glazing as claimed in claim 1, wherein the second glass sheet and, if applicable, a third glass sheet and so on are made of a mineral glass with a thickness of between 5 and 10 mm, or made of a polymer material with a thickness of between 5 and 30 mm.

12. The laminated glazing as claimed in claim 1, wherein the interlayer adhesive layers are made of polyurethane (PU), polyvinyl butyral (PVB), ethylene/vinyl acetate (EVA) or equivalent, wherein a thickness of the first interlayer adhesive layer is between 3 and 10 mm.

13. A method comprising utilizing a laminated glazing as claimed in claim 1 as building, ground, air or water vehicle glazing, or glazing for street furniture.

14. The method as claimed in claim 13, wherein the laminated glazing is an aircraft cockpit glazing.

15. The laminated glazing as claimed in claim 10, wherein the thickness of the first glass sheet is between 2 and 4 mm.

16. The laminated glazing as claimed in claim 1, wherein the first glass sheet is made of a polymer material with a thickness of between 0.5 and 5 mm.

17. The laminated glazing as claimed in claim 16, wherein the polymer material is poly(methyl methacrylate) (PMMA).

18. The laminated glazing as claimed in claim 11, wherein the polymer material is poly(methyl methacrylate) (PMMA).

19. The laminated glazing as claimed in claim 11, wherein the thickness of the polymer is at most 20 mm.

20. The laminated glazing as claimed in claim 12, wherein the thickness of the first interlayer adhesive layer is between 4 and 8 mm.

21. The laminated glazing as claimed in claim 3, wherein a thickness of the second interlayer adhesive layer is between 0.5 and 4 mm.

22. The laminated glazing as claimed in claim 21, wherein the thickness of the second interlayer adhesive layer is at most equal to 2 mm.

\* \* \* \* \*